C. E. BARNES.
MEANS FOR OPENING AND CLOSING GATES AND THE LIKE.
APPLICATION FILED APR. 20, 1908.

912,058. Patented Feb. 9, 1909.

Witnesses.
Lloyd Blackmore.
W. Carnochan.

Inventor.
C. E. Barnes
by C. J. Fetherstonhaugh Atty.

UNITED STATES PATENT OFFICE.

CHARLES EDWARD BARNES, OF LYNDEN, WASHINGTON.

MEANS FOR OPENING AND CLOSING GATES AND THE LIKE.

No. 912,058.     Specification of Letters Patent.     Patented Feb. 9, 1909.

Application filed April 20, 1908. Serial No. 428,129.

*To all whom it may concern:*

Be it known that I, CHARLES EDWARD BARNES, of the town of Lynden, in the State of Washington, in the United States of America, have invented certain new and useful Improvements in Means for Opening and Closing Gates and the Like; and I do hereby declare that the following is a full, clear, and exact description of the same.

The invention relates to improvements in means for opening and closing gates and the like, as described in the present specification and illustrated in the accompanying drawings that form part of the same.

The invention consists essentially in the novel arrangement and construction of parts whereby a jointed bar when operated swings the gate to an open position and retains it until again operated for swinging and holding said gate to its closed position.

The objects of the invention are to devise a simple and easily operated means for opening or closing a gate or the like, to retain it in its said open or closed position and to conveniently operate said gate at a distance on the approach or departure from the gate, particularly from a vehicle.

A further object of the invention is to provide a means of a simple and durable character, inexpensive to furnish and attachable to any ordinary gate.

Figure 1:
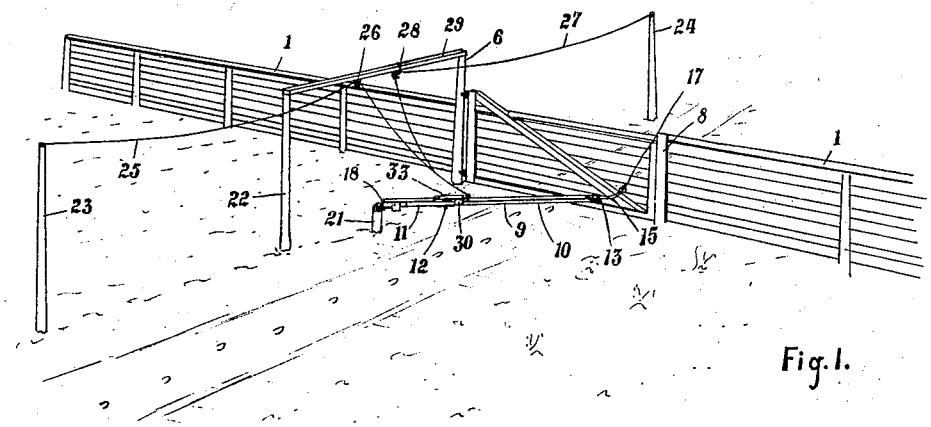
Figure 2:
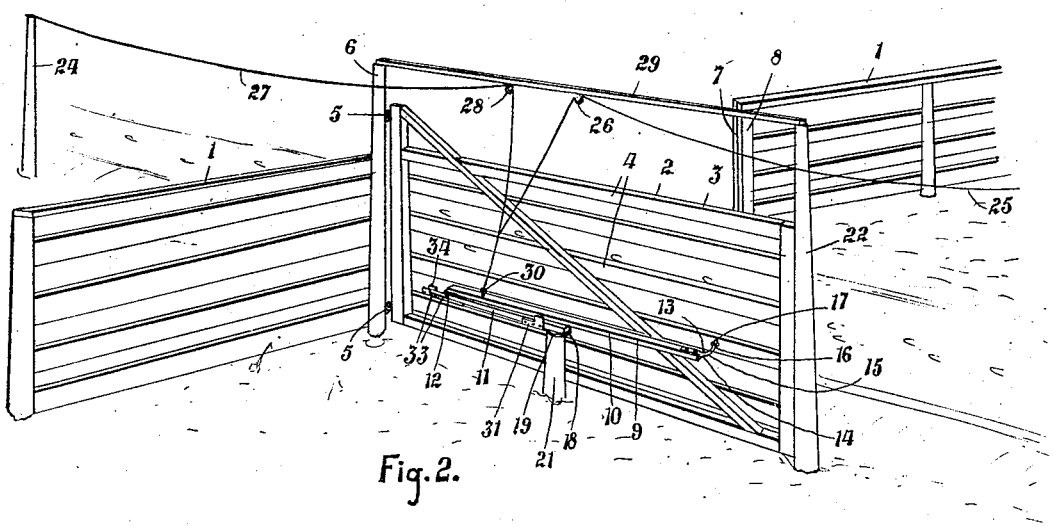
Figure 3:
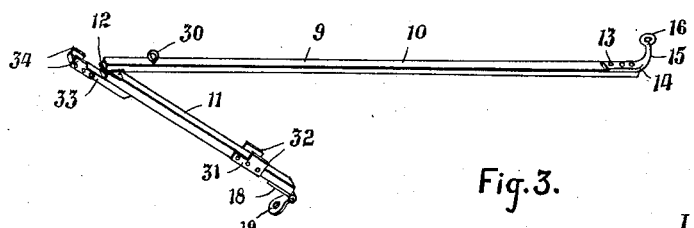

In the drawings, Figure 1 is a perspective view of a line of fence showing a gate in its closed position and my means for opening and closing the same attached thereto. Fig. 2 is a perspective view of the gate illustrated in Fig. 1 showing the position of my device when the gate is in its open position. Fig. 3 is a perspective detail of the bar showing the hinged joint partially folded as in the opening or closing of the gate.

Like numerals of reference indicate corresponding parts in each figure.

1 is the fence and 2 is a gate closing a gap in said fence and of any ordinary construction. The gate as here shown and described has a frame 3 with strips 4 attached thereto. The gate 2 is hinged at the points 5 to the post 6.

7 is a strip against which the gate closes, said strip being attached to the post 8 of the fence 1.

9 is a bar formed of two lengths 10 and 11 said lengths 10 and 11 being hinged one to the other by the hinge 12, the said hinge forming a joint in said bar for purposes hereinafter more fully described.

13 is a rod securely attached at one end of the bar 9 and elbowed at 14 to form the arm 15, the said arm being provided with an eye 16 pivotally secured to the gate 2 by the staple 17 at a point in proximity to the end of said gate which closes against the stop 7 on the post 8.

The bar 9 extends from a post 21 on one side of the roadway and at a short distance from the fence, in an oblique direction to the gate, the said bar being hinged to said post by the hinge 18 and as the eye 16 is secured to the gate by the staple 17 the bar remains suspended between the gate and the post. The leaf of the hinge 18 which is secured to the top of the post has an orifice 19 therethrough and a stout lag screw inserted through said orifice and into said post thereby allowing the said hinge to turn on the top of said post for purposes hereinafter explained. The post 21 is substantially the same height as the staple 17 in said gate. 22 is a post substantially similar in height to the post 6 and in alinement with the said posts 6 and 21 and spaced at such a distance that the outer end of the gate in swinging to its open position will stop against the said post 22.

23 is a post similar to the post 22 and arranged at a still greater distance from the gate 2 and in a nearby position to the roadway leading to said gate. 24 is another post similar to the post 23 and set at some distance on the other side of the gate close to the roadway.

25 is a cord attached at one end thereof to the eye 30 in the length 10 of the bar 9 and adjacent to the joint 12. The cord 25 extends from the said eye through a suitable pulley 26 on the rod 29, the latter extending from top to top of the posts 6 and 22. The cord 25 after passing through the pulley 26 is carried out to the post 23 where it is fastened in any convenient manner and forms the means for operating the bar 9 from one side of the gate, as will be hereinafter more fully described. 27 is a cord extending from the post 24 on the other side of the gate through the pulley 28 arranged on the bar 29 in proximity to the pulley 26 and from thence down to a point on the cord 25 in proximity to the eye 30.

When persons, particularly those in vehicles, approach the gate and wish to open the same in order to pass through, it is only necessary to pull on one or other of the cords 25 or 27 according to the side from which they approach the gate. It will be readily seen that the pull on one or other of these cords will raise the bar 9 at the joint thereof and consequently start the gate to open. As the joint of the bar 9 is raised the length 11 is brought to a vertical position and the impetus given to the gate will swing the same still further and the length 11 will fall into the position shown in Fig. 2, and it will be understood that the weight of the length 11 as also the weight of the length 10 when the said length is in the position shown in Fig. 2 will draw the gate to its complete open position, the hinge 18 turning on the top of the post 21 as hereinbefore explained. On passing through the gate and desiring to close the same it is only necessary to repeat the action of pulling on one or other of the cords 25 or 27 which will again raise the joint of the bar 9 and owing to the angular off-set of the arm 13 the said gate is started to swing to its closed position and on the length 11 reaching its vertical position the impetus of the gate will again carry it over the said vertical position, after which the two lengths 10 and 11 of the bar 9 will, of their own weight, drop into alinement one with the other and effect the closing of the gate.

The position of the hinge 12 on the under side of the bar 9 together with the weight of said bar prevents the gate from being opened by wind or animals, and, as above stated, one or other of the cords 25 or 27 must be pulled to start the opening of the joint 12.

31 are plates bolted to the sides of the length 11 and having the upwardly-extending guard-pieces 32, between which the length 10 will fall. It will be seen that these guard-pieces will prevent any side movement of the length 10 at the joint 12 when the gate is opened. Thus when the gate is in its open position it will be held from blowing shut by the differences in the lengths 10 and 11 of the bar 9 in conjunction with the guard-pieces 32, as it will be seen that owing to the differences in radii of the swing of the gate and the bar 9, being held firmly between the guard-pieces 32, when in its folded position the said bar will firmly hold said gate until the joint 12 is raised and the bar accordingly lengthened. Furthermore the reinforcing piece 33 may be secured to the length 11, the said piece 33 extending for a short distance over the length 10 when the said lengths are in alinement to form the bar 9. The piece 33 has the plates 34 attached thereto similar to the plates 31, and it will be seen on the closing of the gate and the falling of the said lengths 10 and 11, the guard-pieces of the plates 34 will drop to either side of the length 10 and form a secure brace for the bar at the hinged joint thereof.

Heretofore gates have been operated by a joint mechanism attached thereto, but as far as I am aware all such mechanisms have been more or less complicated requiring expensive construction, and opening or closing gates by means of a jointed member is not claimed broadly in this application, the essential features being the particular construction of the two single bars in conjunction with guard plates, which will be readily seen to operate by drawing on a cord secured to one point in the jointed bar, and effectually retaining the gate in its closed position, open the gate to its full extent, retain the gate in its open position, or tightly close the gate.

What I claim as my invention is:

In means for opening and closing gates and the like, the combination with the gate suitably swung from a supporting post, of a long length of bar pivotally attached at one end thereof to said gate, a shorter length of bar hingedly attached at one end to the free end of the long length, and at the other end thereof pivotally and hingedly attached to a short post, means secured to said lengths in proximity to the hinged joints thereof for raising said joint folding the said long length over the said short length and opening the said gate, a plurality of guard-plates secured to the sides of said short length and between which said long length folds down, means attached to said lengths in proximity to said hinged joint for raising the same and unfolding the said lengths, a reinforcing strip extending from the shorter of said lengths over a portion of said long length and a plurality of plates securely fixed to the sides of said reinforcing strip and extending downwardly on either side of said long strip when the said gate is in closed position.

Signed at Lynden Washington this 8th day of February A. D. 1908.

CHARLES EDWARD BARNES.

In the presence of—
BENJAMIN OLDEMEYER,
AARON L. BERG.